United States Patent

[11] 3,592,126

[72] Inventor Eugene S. Dombrowik
    New Britain, Conn.
[21] Appl. No. 886,442
[22] Filed Dec. 19, 1969
[45] Patented July 13, 1971
[73] Assignee General Electric Company

[54] COFFEEMAKER FILTER
    7 Claims, 4 Drawing Figs.
[52] U.S. Cl. .................................. 99/312,
    210/474
[51] Int. Cl. .................................. A47j 31/08
[50] Field of Search ........................... 99/310,
    312, 323, 307, 308, 311; 210/474, 497

[56] References Cited
    UNITED STATES PATENTS
2,257,944 10/1941 Fischbein .................... 210/497
2,546,874 3/1951 Siegrist ...................... 99/310
2,948,212 8/1960 Sisselman .................... 99/310
3,225,680 12/1965 Cirrincione .................. 99/312

Primary Examiner—Robert W. Jenkins
Attorneys—Lawrence R. Kempton, Leonard J. Platt, John F. Cullen, Frank L. Neuhauser, Oscar B. Waddell and Joseph B. Forman ABSTRACT: A coffeemaker filter basket wherein the sidewalls of the filter have smaller openings than the bottom wall of the filter.

PATENTED JUL 13 1971  3,592,126

Inventor:
Eugene S. Dombrowik
by Leonard J. Platt
Attorney

COFFEEMAKER FILTER

BACKGROUND OF THE INVENTION

This invention relates to a coffeemaker filter, and more particularly, to a fine filter which may be inserted within a conventional metal coffeemaker basket for effectively filtering fine particles from liquid coffee which is being brewed.

As is well known in the electric coffee percolator art, ground coffee is positioned within a metal coffeemaker basket, and a metal perk tube extends upwardly within the coffee maker for permitting hot percolated water to flow upwardly through the perk tube and then over the grounds in the coffeemaker basket. Apertures are provided within the basket to allow brewed coffee to flow therethrough. While such metal coffeemaker baskets effectively hold the coffee grounds, the apertures formed therein are usually so large that they permit small coffee particles to flow through the basket to the lower portion of the coffeemaker where the minute particles are boiled with the brewed coffee. With such a conventional coffee percolator, the small particles which flow through the coffeemaker basket provide sediment at the lower portion of the coffeemaker, and continued boiling of the sediment releases distasteful bitter coffee oils. The sediment and the coffee oils may be poured out of the coffee percolator, and thus, they result in a cup of coffee which is not too tasteful.

Many different secondary fine filter constructions have been used in combination with conventional metal coffeemaker baskets. However, these prior art fine filters have usually taken the form of disposable paper filters or similar filter constructions wherein the porosity of the filter material is substantially uniform at the sides and bottom of the filter, and accordingly, the filters have not been especially effective.

SUMMARY OF THE INVENTION

A primary object of this invention to provide an improved fine filter construction for a coffee percolator wherein filter materials or different meshes are provided for effectively filtering fine sediment particles from the coffee brew.

In accordance with one of the aspects of this invention a generally cylindrical frame member is provided for holding different mesh filter materials. The frame member includes a generally circular sidewall and a generally flat bottom wall. A very fine mesh filter material is connected to the circular sidewalls of the frame, and a coarser mesh filter material is connected to the bottom wall of the frame. With this arrangement, while the openings in the filter material on the sidewalls of the frame are smaller than the openings in the filter material on the bottom wall of the frame, brewed coffee flows rather rapidly through the sidewalls of the filter since such flow is substantially unimpeded by packed coffee grounds. Brewed coffee also flows through the coffee grounds at the lower portion of the coffeemaker filter basket, and although the apertures in the bottom wall of the coffeemaker filter basket are somewhat larger than the apertures in the sidewall of the filter basket, the filtering action at the bottom of the basket is substantially as fine, if not finer, than the filtering action at the sidewalls of the basket since the coffee grounds themselves filter the brewed coffee and obstruct portions of the openings on the bottom wall of the filter. Accordingly, a very simple yet effective fine filter basket for an electric percolator has been achieved.

With this improved fine filter construction, most, if not all, of the sediment is contained within the improved fine mesh filter basket, and very little sediment, if any, is contained within the brewed coffee. Thus, a vastly improved coffee brew is achieved. The coffee brew naturally tastes better because it does not contain as much oil or acid, and obviously, it does not have the bitter smaller particles of sediment. In addition, since all of the sediment is contained closely packed in the improved filter basket, less oil and acid is extracted from these sediment particles than would be extracted if the sediment particles reached the lower portion of the coffeemaker and were constantly boiled and moved by the circulating water within the lower portion of the coffeemaker. Moreover, with the larger apertures in the bottom wall of the fine filter basket, the rate of flow of brewed coffee through the bottom walls and sidewalls of the basket is great enough so that brewed coffee and coffee grounds do not flow over the top of the sidewalls of the basket.

BRIEF DESCRIPTION OF THE DRAWINGS

Other objects and attendant advantages of this invention will be apparent from the following description taken in connection with the accompanying drawing in which.

DESCRIPTION OF THE PREFERRED EMBODIMENT

Figure 1:
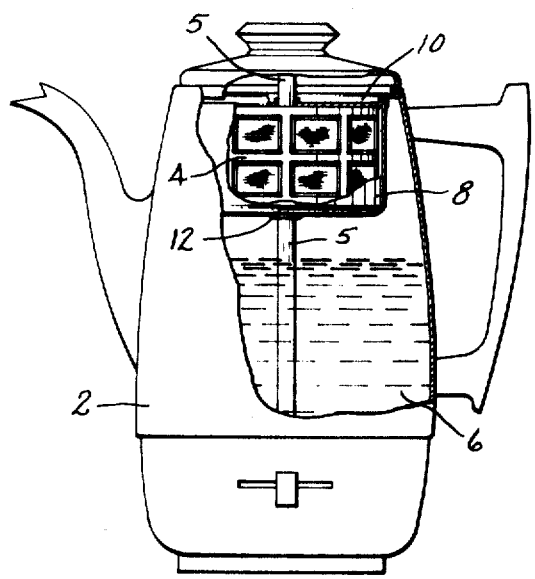
FIG. 1 is a side elevational view of an electric coffeemaker embodying the invention partly broken away to show details of construction of the coffeemaker filter basket.

Referring now to the drawing and first particularly to FIG. 1, there is shown an electric coffeemaker 2 embodying my improved coffeemaker filter basket 4. The percolator includes a water receptacle 6, and as shown, a percolator tube 5 extends upwardly through the receptacle through a metal coffee basket 8 and through a spreader plate 10. Conventionally, a raised lip 12 is formed on the outside surface of the percolator tube 5 for cooperating with a small centrally disposed opening formed in the coffeemaker basket 8 for holding the coffeemaker basket on the percolator tube. The metal spreader plate or cover 10 for the coffeemaker basket 8 is conventionally provided with a plurality of apertures for spreading the hot percolator water which flows downwardly on top of the spreader plate from the percolator tube 5.

COFFEEMAKER FILTER

Figure 4:
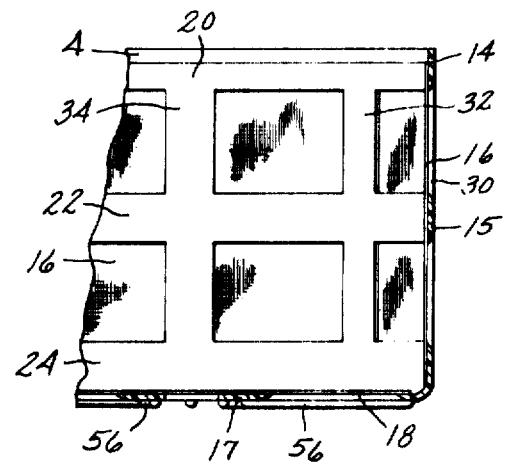
FIG. 4 is a cross-sectional view of the coffeemaker filter basket taken substantially on the plane 4—4 of FIG. 1.
Figure 2:
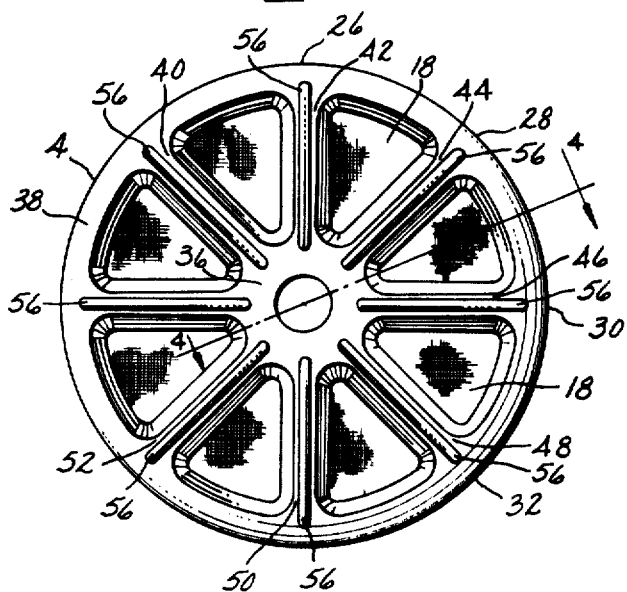
FIG. 2 is a bottom plan view of the coffeemaker filter basket embodying the invention.
Figure 3:
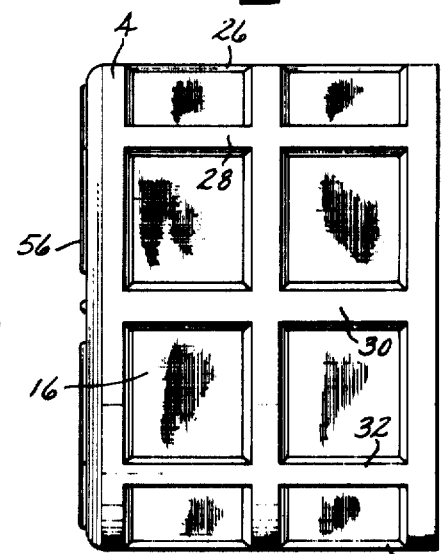
FIG. 3 is s side elevational view of the coffeemaker filter basket shown in FIG. 1.

According to my invention a unique coffeemaker filter 4 is positioned within the conventional metal coffeemaker basket 8 for effectively filtering fine particles from the brewed coffee. As shown more particularly in FIGS. 3 and 4, the coffeemaker filter includes a generally cylindrical frame member 14 for holding a fine-mesh filter material 16 on a generally cylindrical sidewall 15 and a coarser mesh filter material 18 on a generally flat bottom wall 17. With reference to FIGS. 1, 3 and 4, the circular sidewall 15 of the generally cylindrical filter basket 4 is formed of three circular rings of plastic 20, 22 and 24 which are preferably integrally molded with a plurality of generally vertical ribs 26, 28, 30, 32 and 34. It can also be seen, with particular reference to FIG. 2, that the generally flat bottom wall of the cylindrical frame is formed of an inner small diameter plastic ring 36, a larger diameter plastic ring 38 and a plurality of plastic spokes 40, 42, 44, 46, 48, 50, 52 and 54 which extend radially between the inner ring 36 and the outer ring 38. Preferably, all of the aforementioned rings, spokes and ribs are integrally molded of a flexible plastic material; however, it can be appreciated that any other suitable material may be used for forming the frame member.

As shown more particularly in FIG. 4, the fine-mesh filter material 16 may be readily attached to the inside surface of the generally cylindrical sidewall 15, and the coarser mesh filter material 18 may be readily attached to the upper surface of the generally flat bottom wall 17. The material of both the coarse filter 18 and the finer filter 16 is preferably very fine mesh nylon screening approximately 0.003 inch thick although other materials such as stainless steel wire mesh and other plastics could be used.

It has been found that for effective filtering action, the filter material on the sidewalls should have apertures of approximately 75 microns in size and the filter material on the bottom wall should have apertures of approximately 150 microns in size. This differential in the apertures of the filter material for the sidewalls as compared with the apertures in the filter material for the bottom wall is critical in achieving my unique effective coffee filter. With the apertures in the sidewalls smaller than the apertures in the bottom wall, the combined filter material effectively filters the coffee brew not only as a result of the filter screens themselves, but because they are related to each other and to the coffee grounds so that the coffee grounds act as a natural filter bed throughout the coffee making cycle. The initial slugs of water permeate the dry coffee grounds and are passed readily through the grounds and through the relatively coarse of openings in the bottom filter screen 18. After the action of the pumping cycle is increased and more and more water flows out of the perk tube 5, the coffee grounds are thoroughly wetted and expanded somewhat. At this period in the coffee-making cycle, more water is pumped through the coffee percolator tube than can pass in a natural filtration way through the coffee grounds, thus agitation and swirling of the upper portion of the coffee grounds takes place. During this swirling and fluidization of the grounds at the upper portion of the coffee grounds, the finer filter material of approximately 75 microns in size effectively filters the fluidized coffee grounds and brew without permitting the passage of mud or sediment through the 75-micron-size apertures. It can be seen that the flow through such apertures is relatively unimpeded by the coffee grounds themselves because they are being swirled around the upper portion of the coffee grounds. Also, during this stage of the coffee-making cycle, some water flows through the coffee grounds, and the coffee grounds themselves act as a filter to trap sediment and other fine particles, and eventually, the fluid flows through the relative large 150-micron apertures at the bottom of the bed of coffee grounds. Smaller apertures in the bottom wall would only serve to impede the flow of already filtered brewed coffee and could cause the coffee brew and grounds to flow over the top and sidewalls of my unique coffeemaker basket filter. Thus, with my unique arrangement of 75-micron apertures in the sidewalls and 150-micron apertures in the bottom walls, a very effective coffeemaker filter which filters most of the mud and sediment without overflow is achieved.

Referring now to FIGS. 1 and 4, it can be seen that my unique coffeemaker filter is particularly designed so that its circular sidewalls are spaced from the circular sidewall of the metal coffeemaker basket 8, and also, its bottom wall 18 is effectively spaced from the bottom wall of the metal coffeemaker basket 8. This is very desirable to prevent the filter material 16 and 18 from being placed in contact with the sides and bottom walls of the metal coffeemaker basket 8 thereby impeding the flow through the filter material. To achieve this, a plurality of downwardly extending feet 56 may be integrally formed on the lower surfaces of the radial spokes 40, 42, 44, 46, 48, 50, 52 and 54 to thereby space the filter material 18 above the generally flat bottom wall of the metal coffeemaker basket 8. In a similar manner, the outer surfaces of the circular rings 20, 22 and 24, and ribs 26, 28, 30, 32 and 34 are outwardly disposed from the outer surface of the filter material 16 to thereby prevent the filter material 16 from being placed in contact with the inside wall of the metal basket 8. Moreover, if desired, additional ribs may also be formed on the sidewalls of the filter basket to space the nylon filter material away from the metal coffeemaker basket. In addition, with reference to FIG. 1, it can be seen that the outer diameter of the sidewall rings and ribs is somewhat less than the inside diameter of the metal coffee maker basket 8, and these dimensions naturally space the filter material 16 away from the inside walls of the metal coffeemaker basket. With this arrangement, enough space is left between the nylon screen 16 and the metal coffee basket 8 to allow water and brewed coffee to flow out of the sidewalls 16, down between the outside of the filter basket and the inside of the metal basket and down through the apertures in the bottom wall of metal basket 8.

From the foregoing description, it can be seen that my unique coffeemaker basket with 75-micron apertures in the sidewalls and 150-micron apertures in the bottom wall effectively utilizes the coffee grounds themselves as a natural filter bed. The unique filter relies on the fact that for a given height of coffee grounds, the grounds can only pass a measured rate of waterflow and still maintain the natural filtering action. When the point is reached that the coffee grounds filter bed cannot handle any increase in coffee brew flow, then the excess passes through the sidewall 16 of the nylon screening. Thus, no mud is produced, and the grounds do not flow over the top of the coffeemaker filter basket. Moreover, since 75-micron-mesh nylon screening is utilized along the whole height of the sidewalls from ring 24 upwardly, any capacity of coffee grounds in the coffeemaker filter from a medium amount of coffee grounds to a maximum amount of coffee grounds will be effectively filtered by my unique coffeemaker filter.

It will also be appreciated that my unique coffeemaker filter achieves a degree of effectiveness which cannot be obtained by a paper-type filter or other filters which utilize uniform mesh filter materials. While a paper-type filter may produce good filtration, the process is slow and the filter itself actually filters out mud and fine particles after being produced. With my unique filter arrangement the filter basket prevents the formation of mud since the small particles are retained in position in the bed of larger coffee grounds. Thus, an exceedingly simple, yet very effective coffeemaker filter has been achieved.

What I claim is:

1. A coffeemaker filter basket for receiving ground coffee comprising:
   a. a generally cylindrical frame member having a generally circular sidewall and a generally flat bottom wall;
   b. A very fine mesh filter material connected to the circular sidewall of said frame; and
   c. a fine mesh filter material connected to the bottom wall of said frame, the openings in the filter material on the sidewalls of said frame being smaller than the openings in the filter material on the generally flat bottom wall of said frame so that brewed liquid coffee flows readily through the small openings in the sidewalls of said coffee filter basket and the coffee grounds in the bottom of the basket prefilter the brewed coffee before it passes through the larger openings in the generally flat bottom wall of the filter basket.

2. A coffeemaker filter basket as defined in claim 1 wherein the apertures in the fine mesh filter material on the bottom wall are between 100 and 200 microns in size.

3. An improved coffeemaker filter as defined in claim 1 wherein the apertures in the fine mesh filter material on the bottom wall are between 100 and 200 microns in size, and the apertures in the very fine mesh filter material on the circular sidewall of the frame are between 60 and 90 microns in size.

4. A coffeemaker filter basket as defined in claim 1 wherein the apertures in the fine mesh filter material on the bottom wall of the frame are 150 microns in size and the apertures in the very fine mesh filter material on the circular sidewall of the frame are 75 microns in size.

5. A coffeemaker filter basket as defined in claim 1 wherein the generally circular sidewall of said frame is formed of three circular rings of plastic vertically spaced from each other and integrally connected to each other by a plurality of generally parallel plastic ribs, and the very fine mesh filter material is connected to the inside surfaces of said circular rings and ribs.

6. A coffeemaker filter basket as defined in claim 1 wherein the generally flat bottom wall of said frame is formed of a small-diameter plastic ring, a large-diameter plastic ring and a plurality of plastic spokes extending radially from the small-diameter ring to the large-diameter ring for integrally connecting the rings to each other, and the fine mesh filter material is connected to the upper surfaces of the rings and plastic spokes.

7. A coffee percolator comprising:

a. a liquid receptacle;
b. a percolator tube positioned within said liquid receptacle;
c. a metal coffee basket mounted on the upper portion of said percolator tube, said metal basket having a generally circular sidewall, a generally flat bottom wall and a plurality of relatively large apertures formed in said bottom wall;
d. a spreader plate having a plurality of apertures formed therein positioned on top of said metal coffee basket; and
e. a coffeemaker filter basket as defined in claim 1 positioned within said metal coffeemaker basket, the generally circular sidewall of said coffeemaker filter basket being spaced inwardly from the generally circular sidewall of said metal coffeemaker basket, and the generally flat bottom wall of said coffeemaker filter basket being spaced upwardly from the generally flat bottom wall of said metal coffee basket so that boiling water may flow upwardly through said percolator tube downwardly through the openings in said spreader plate downwardly into the coffeemaker filter, outwardly through the filter material of the filter basket and through the relatively large apertures in the bottom wall of the metal coffeemaker basket to the lower portion of the liquid receptacle.